United States Patent [19]

Sakurai et al.

[11] Patent Number: 5,211,970
[45] Date of Patent: May 18, 1993

[54] HYDRAULIC CLAMPING APPARATUS FOR AN INJECTION MOLDING MACHINE

[76] Inventors: Hiroshi Sakurai, 10-1 Sugita 9-chome, Isogo-ku, Yokohama-shi, Kanagawa-ken, Japan; Yong Chul Kim, 120-11 Hanshin 16 Apartment Jamwon-Dong, Socho-ku, Seoul, Rep. of Korea

[21] Appl. No.: 820,483
[22] Filed: Jan. 14, 1992
[51] Int. Cl.$^5$ .............................................. A23P 1/00
[52] U.S. Cl. ................................. 425/595; 425/450.1; 425/451
[58] Field of Search ....................... 425/450.1, 451, 595

[56] References Cited

U.S. PATENT DOCUMENTS 4,545,756 10/1985 Hiroshi et al. ...................... 425/590

FOREIGN PATENT DOCUMENTS 46-9264  1/1971 Japan ........................................ 51/52
49-44064 3/1974 Japan ........................................ 51/52

Primary Examiner—Bernard Nozick
Attorney, Agent, or Firm—John E. Toupal; Harold G. Jarcho

[57] ABSTRACT

A hydraulic clamping apparatus for use with injection molding machines and including a first hydraulic actuator having a first cylinder and a first hollow, cup-shaped piston with a closed head portion disposed for reciprocating movement within the first cylinder, and a foot portion axially spaced from said head portion and defining an opening; a second hydraulic actuator having a second piston, a rod extending axially through the opening into the first piston and connected between the first and second pistons, and a second cylinder mounted for reciprocating movement on the second piston and through the opening between a recessed position substantially within the first piston and an extended position substantially outside the first piston; and a clutch operable in the extended position of the second cylinder to produce engagement thereof with the first piston. The overall length of the apparatus is minimized by placement of the second actuator cylinder within the first piston.

20 Claims, 3 Drawing Sheets

HYDRAULIC CLAMPING APPARATUS FOR AN INJECTION MOLDING MACHINE

BACKGROUND OF THE INVENTION

This invention relates generally to hydraulic clamping apparatus and, more particularly, to hydraulic clamping apparatus for injection molding machines.

According to typical prior art hydraulic mold clamping systems, a small quick feed cylinder is retained by the ram piston of a large high force cylinder. Thus, during a quick feed stroke of the mold produced by the small cylinder, the large ram piston must also move. This factor undesirably entails the flow of large oils volumes to the large cylinder. In some systems this results in loss of power and often requires costly special buffers in the hydraulic circuits to switch clamping speed and to prevent shocks at stoppage. In other systems, the large oil flow creates air bubbles that cause the apparatus to produce unacceptable finished parts. In addition, the requirement for rapid, lengthly movement of the large ram piston substantially increases both machining and repair costs of the apparatus.

Many of the above disadvantages are obviated by mold clamping systems disclosed by Japanese Utility Model Nos. 46-9264 and 49-44064. Disclosed thereby are mold clamping arrangements in which a small diameter piston reciprocates independently of a large diameter ram piston to provide quick feed movement of a mold. Subsequently, a clutch mechanism engages the ram piston which then provides a short stroke that results in a high closure force on the mold pieces. Although offering some improvement, these systems also suffer deficiencies including the requirement for high pressure seals subject to lengthly quick feed piston strokes, the requirement for replacing clutch mechanisms when mold sizes are changed and problems associated with accurately repeatable clutch mechanism movement. Many of those deficiencies are eliminated by apparatus disclosed in U.S. Pat. No. 4,545,756. However, the clamping apparatus disclosed therein exhibits an overall size that is undesirable for certain applications.

The object of this invention, therefore, is to provide an improved hydraulic clamping apparatus for injection molding machines.

SUMMARY OF THE INVENTION

The invention is a hydraulic clamping apparatus for use with injection molding machines and including a first hydraulic actuator having a first cylinder and a first hollow, cup-shaped piston with a closed head portion disposed for reciprocating movement within the first cylinder, and a foot portion axially paced from said head portion and defining an opening; a second hydraulic actuator having a second piston, a rod extending axially through the opening into the first piston and connected between the first and second pistons, and a second cylinder mounted for reciprocating movement on the second piston and through the opening between a recessed position substantially within the first piston and an extended position substantially outside the first piston; and a clutch operable in the extended position of the second cylinder to produce engagement thereof with the first piston. The overall length of the apparatus is minimized by placement of the second actuator cylinder within the first piston.

According to one feature of the invention, the clutch is mounted on for movement with an inner end of the second cylinder and adapted for radially directed movement thereon into engagement with the first piston. This feature facilitates joint effort by the first piston and secured cylinder during a high force clamping stroke of the apparatus.

According to another feature of the invention, the foot portion defines an annular end wall surrounding the opening, and the radially directed movement engages the clutch and annular end wall. This feature provides with an efficient structure the functional engagement between the second cylinder and first piston.

According to yet another feature of the invention, the clutch comprises a plurality of hydraulically actuated clutch members movable radially from the second cylinder into engagement with the annular end wall. The plurality of clutch members establish a desirable distributed engagement.

According to a further feature of the invention, the inner end of the second cylinder defines a transversely directed flange portion retaining the clutch members. The flange portion establishes a convenient housing for the clutch members.

According to additional features of the invention, the first cylinder is cup-shaped with a closed end and an open end joined by a cylindrical wall portion, the head portion is disposed adjacent to the closed end, the head and said foot portions are joined by a recessed skirt portion defining with the cylindrical wall portion an annular chamber, and the first cylinder defines a clamping port communicating with a cavity defined between the head portion and the closed end and a release port communicating with the annular chamber. This configuration facilitates in a compact structural arrangement desired clamping a release strokes by the first piston.

According to still another feature of the invention, the apparatus includes an annular seal means disposed in the annular chamber and longitudinally spaced from the flange portion, and the first cylinder further defines a stop port communicating with the interior thereof and longitudinally spaced from its closed end by a distance less than the longitudinal spacing between the annular seal means and the head portion with the head portion of the first piston engaging the closed end of the first cylinder. This feature prevents damage to the annular seal by preventing clamping strokes of excessive length.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
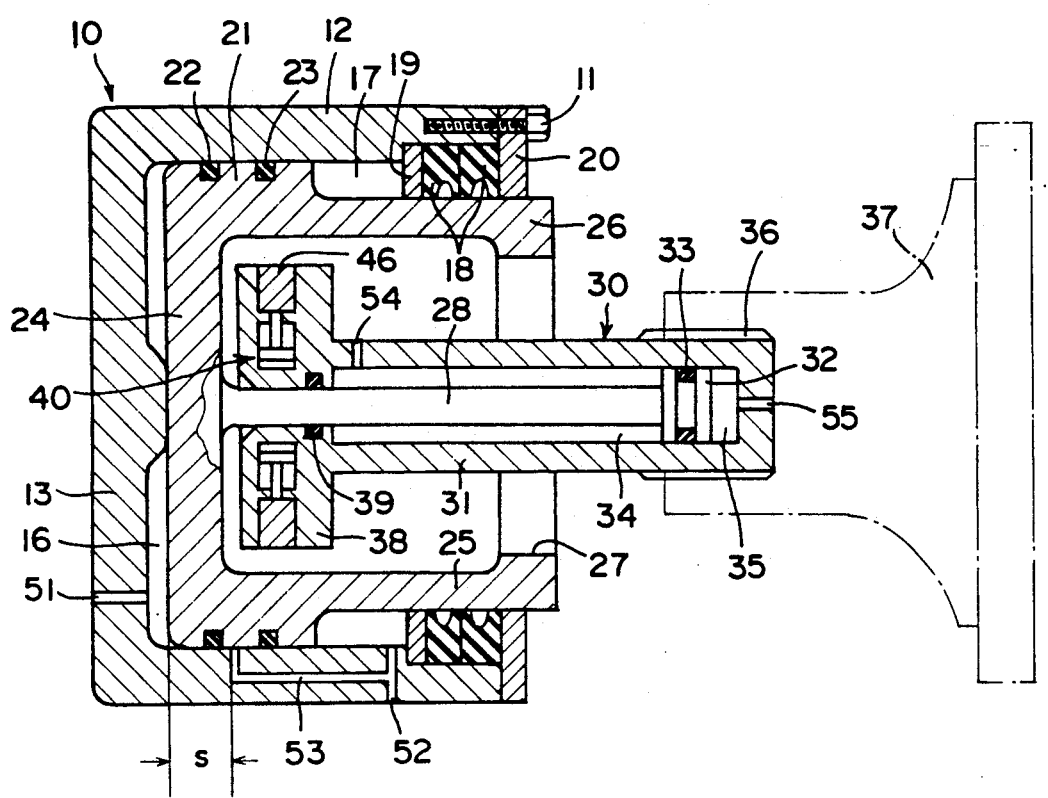
FIG. 1 is a longitudinal cross-sectional view of the clamping apparatus according to the invention.

A clamping apparatus according to the invention includes a first hydraulic actuator with a cup-shaped cylinder 10 including an open end 11 and a closed end 13 joined by a cylindrical wall portion 12. Also included in the first actuator is a first piston 21 mounted for reciprocation within the first cylinder 10. A head portion 24 of the first piston 21 is disposed adjacent to the closed end 13 of the first cylinder 10 and defines therewith a cavity 16 while a foot portion of the piston 21 defines an opening 27. Surrounding the opening 27 is an annular endwall surface 26 defined by the foot portion of the piston 21. A recessed skirt portion 25 of the first piston 21 joins the head and foot portions 24, 26 thereof and defines with the cylindrical wall portion 12 of the cylinder 10 an annular chamber 17. Retained within the annular chamber 17 between the cylindrical wall portion 23 of the cylinder 10 and the skirt portion 25 of the piston 21 are a spacer ring 19 and a pair of seal rings 18 confined between an annular retainer ring 20 secured by bolts to the open end 11 and an internal shoulder formed by a counterbore in the cylindrical wall portion 12 of the cylinder 10. A pair of O-rings 22, 23 provide fluid seals between the head portion 24 of the piston 21 and the cylindrical wall portion 12 of the first cylinder 10.

A second hydraulic actuator 30 includes a second cylinder 31 retaining a second piston 32 and defining on opposite sides thereof chambers 34, 35. Connected between the second piston 32 and the head portion 24 of the first piston 21 is a connecting rod 28. An O-ring 33 retained in an annular groove in the second piston 32 provides a fluid seal between the chambers 34, 35. Threadedly engaged to an outer end 36 of the second cylinder 31 is a die 37 for use in an injection molding application. An inner end of the second cylinder 31 is slidably engaged on the connecting rod 28 and has a transversely extending flange portion 38 disposed within the first piston 21. Providing a fluid seal between the connecting rod 28 and the inner end flange portion 38 is an O-ring 39 retained by an annular groove therein.

A clutch mechanism 40 includes a pair of clutch plate members 46 mounted for reciprocating, radially directed movement within slots 47 formed at diametrically opposed positions on the flange portion 38. Projections 47a extend into the slots 47 and each defines a cylinder 41 forming a chamber 45 communicating with hydraulic fluid channels (not shown). Reciprocatively mounted within each of the chambers 45 is a piston 42 connected to an inner recessed end 46a of one of the clutch plate members 46 by a rod 43.

Formed in the closed end 13 of the first cylinder 10 is a hydraulic fluid clamping port 51 while a hydraulic fluid release port 52 extends through the cylindrical wall portion 12. The clamping port 51 communicates with the cavity 16 between the piston head portion 24 and the cylinders closed end 13 while the release port 52 communicates with the annular chamber 17. A stop port 53 extends between the release port 52 and a point on the inner surface of the cylindrical wall portion 12 separated from the closed end 13 by a distance S less than the spacing between head portion 24 of the piston 21 and the ring 19. Formed in the second cylinder 31 are a retraction port 54 and a drive port 55 providing hydraulic fluid communication with, respectively, the chambers 34, 35 on opposite sides of the second piston 32.

OPERATION

Figure 2:
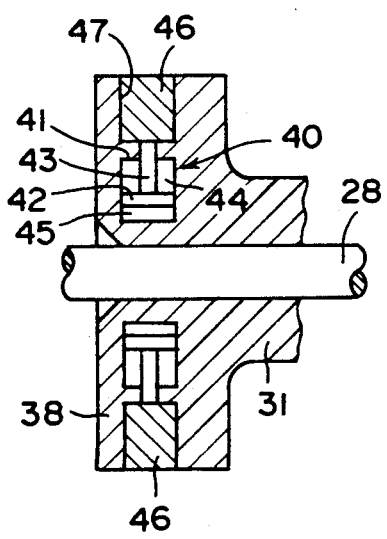
FIG. 2 is an enlarged sectional view of a clutch mechanism illustrated in FIG. 1.
Figure 3:
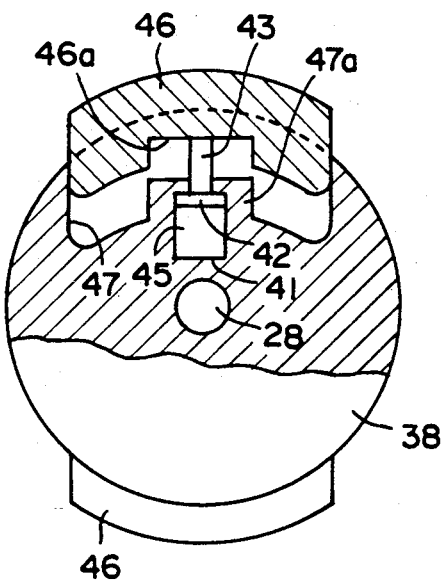
FIG. 3 is a transverse cross-sectional view of the clutch mechanism shown in FIG. 2.
Figure 4:
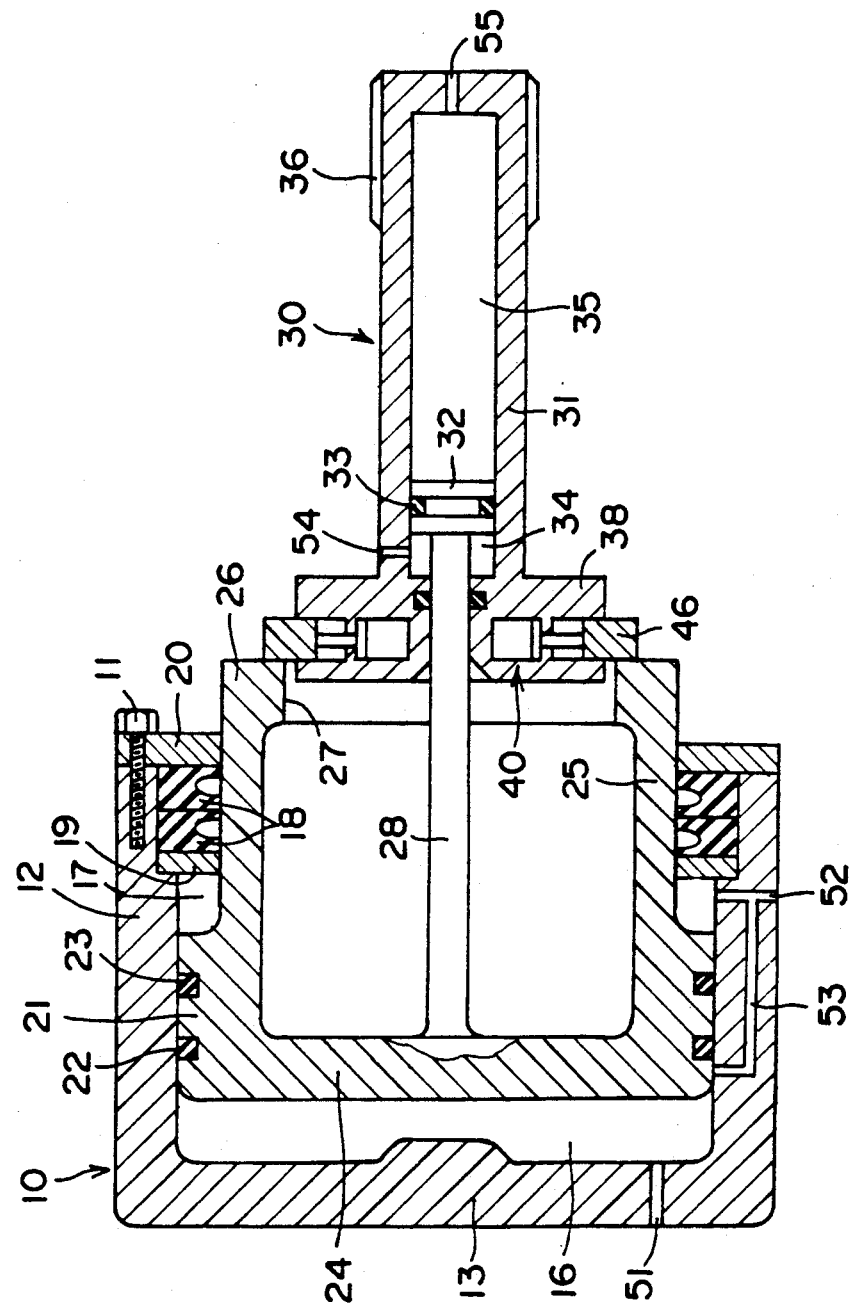
FIG. 4 is a longitudinal cross-sectional view similar to FIG. 1 but with the apparatus in a different operating position.

Prior to the initiation of a molding stroke by the die 37, the various components are in the positions illustrated in FIGS. 1 and 2. In response, to hydraulic fluid pumped through the drive port 55, pressure in the chamber 35 forces the second cylinder 31 from a recessed position within the first piston 21 (FIG. 1) to an extended position outside the first piston 21 (FIG. 4). During this movement of the second cylinder 31, the clutch plate members 46 remain in retracted positions shown in FIG. 1 to permit passage of the flange portion 38 through the opening 27. Because of the relatively small diameter of the cylinder 31, the initial stroke of the die 37 is relatively fast. After this initial stroke of the die 37, fluid pressure is applied to the clutch chambers 45 producing radially outward movement of the clutch pistons 42 and connected clutch plate members 46 into the projected positions shown in FIGS. 3 and 4. In those projected positions, the clutch plate members 46 engage the annular end wall surface 26 of the first piston 21. Next, hydraulic fluid is pumped through the clamping port 51 producing fluid pressure in the cavity 16 that moves the first piston 21 into its clamping position shown in FIG. 4. Because of the engagement between the clutch members 46 and the end surface 26, that movement of the first piston 21 also produces movement of the second cylinder 31 and the die 37 attached thereto. The relatively large diameter of the first cylinder 21 and the first piston 21 produces a relatively high clamping force for the die 37. After completion of both molding strokes, the clutch members 46 are hydraulically actuated into their retracted positions (FIG. 2). Hydraulic fluid then is pumped into the retraction portion 54 producing pressure in the chamber 34 that moves the second cylinder 31 into its recessed position within the first piston 21 (FIG. 1) and through the release port 52 producing pressure in the annular chamber 17 that returns the first piston 21 into its recessed position (FIG. 1).

Figure 5:
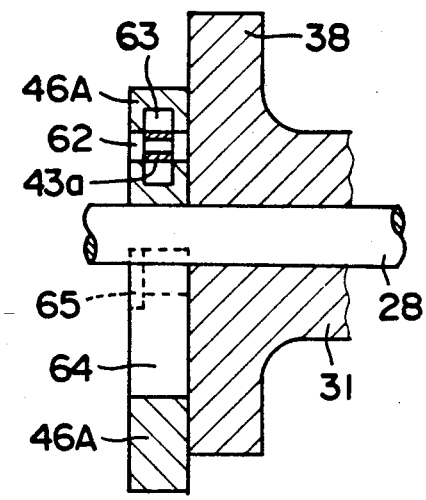
FIG. 5 is a longitudinal cross-sectional view of a modified clutch mechanism for use with the apparatus shown in FIG. 1.
Figure 6:
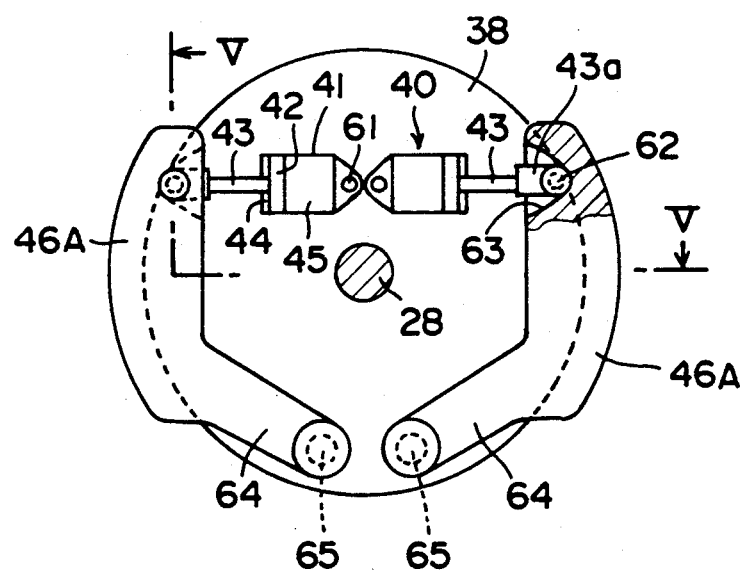
FIG. 6 is a transverse sectional view of the clutch mechanism shown in FIG. 5.

Illustrated in FIGS. 5 and 6 is another clutch mechanism embodiment for use with the apparatus shown in FIG. 1. Components similar to those shown in FIGS. 1-4 have been given corresponding reference numerals in FIGS. 5 and 6. Pivotally mounted by pins 61 to an outer surface 50 of the flange portion 38 are a pair of hydraulic cylinders 51. Mounted for reciprocation within each of the cylinders 51 is a piston 52 separating fluid chambers 54, 55. Also pivotally mounted on the surface 50 by pins 65 are a pair of arms 64 each having an arcuate clutch portion 66. A pivot pin 62 extending from opposite surfaces of a groove 63 formed in each of the arms 64 is joined by a connector 68 to a pin 53 attached to one of the pistons 52.

When equipped with the clutch mechanism shown in FIGS. 5 and 6, the apparatus of FIGS. 1-4 operates in a manner similar to that described above. During strokes of the second cylinder 31 out of or into the first piston 21, the hydraulic chambers 54 are pressurized to force the pistons 52 inwardly. Associated inward movement of the rods 53 produces inward pivotal movement of the arms 64 moving the arcuate clutch portions 66 into juxtaposition with the outer surface 50 of the flange portion 38. However, prior to a clamping stroke by the piston 21, the chambers 55 are pressurized producing outward movement of the pistons 52 into the positions shown in FIG. 6. In those extended positions, the arcuate clutch portions 66 engage the annular end wall surface 26 of the first piston 21 such that outward movement thereof is transmitted by the second cylinder 31 to the die 37.

Obviously, many modifications and variations of the present invention are possible in light of the above teachings. It is to be understood, therefore, that the invention can be practiced otherwise than as specifically described.

What is claimed is:

1. Hydraulic clamping apparatus for injection molding machines comprising:
    a first hydraulic actuator means comprising a first cylinder and a first hollow, cup-shaped piston including a closed head portion disposed for reciprocating movement within said first cylinder, and a foot portion axially spaced from said head portion and defining an opening;
    a second hydraulic actuator means comprising a second piston, a rod extending axially through said opening into said first piston and connected between said first and second pistons, and a second cylinder mounted for reciprocating movement on said second piston and through said opening between a recessed position substantially within said first piston, and an extended position substantially outside said first piston; and
    clutch means operable in said extended position of said second cylinder to produce engagement thereof with said first piston.

2. A hydraulic clamping apparatus according to claim 1 wherein an outer end of said second cylinder is fixed to a die adapted for injection molding.

3. A hydraulic clamping apparatus according to claim 1 wherein said clutch means is mounted on for movement with an inner end of said second cylinder and adapted for radially directed movement thereon into engagement with said first piston.

4. A hydraulic clamping apparatus according to claim 3 wherein said clutch means is hydraulically actuated.

5. A hydraulic clamping apparatus according to claim 3 wherein said foot portion defines an annular end wall surrounding said opening, and said radially directed movement engages said clutch means and said annular end wall.

6. A hydraulic clamping apparatus according to claim 5 wherein said clutch means comprises a plurality of hydraulically actuated clutch members movable radially from said second cylinder into engagement with said annular end wall.

7. A hydraulic clamping apparatus according to claim 6 wherein said inner end of said second cylinder defines a transversely directed flange portion retaining said clutch members.

8. A hydraulic clamping apparatus according to claim 6 wherein said clutch members are pivotally mounted on said second cylinder.

9. A hydraulic clamping apparatus according to claim 6 wherein said clutch members are reciprocably mounted on said second cylinder.

10. A hydraulic clamping apparatus according to claim 1 wherein said first cylinder is cup-shaped with a closed end and an open end joined by a cylindrical wall portion, and said head portion is disposed adjacent to said closed end.

11. A hydraulic clamping apparatus according to claim 10 wherein said head portion and said foot portion are joined by a recessed skirt portion defining with said cylindrical wall portion an annular chamber.

12. A hydraulic clamping apparatus according to claim 11 wherein said first cylinder defines a clamping port communicating with a cavity defined between said head portion and said closed end and a release port communicating with said annular chamber.

13. A hydraulic clamping apparatus according to claim 12 wherein said clutch means is mounted on for movement with an inner end of said second cylinder and adapted for radially directed movement into engagement with said first piston.

14. A hydraulic clamping apparatus according to claim 13 wherein said clutch means is hydraulically actuated.

15. A hydraulic clamping apparatus according to claim 13 wherein said foot portion defines an annular end wall surrounding said opening, and said radially directed movement engages said clutch means and said annular end wall.

16. A hydraulic clamping apparatus according to claim 15 wherein said clutch means comprises a plurality of hydraulically actuated clutch members movable radially from said second cylinder into engagement with said annular end wall.

17. A hydraulic clamping apparatus according to claim 16 wherein said inner end of said second cylinder defines a transversely directed flange portion retaining said clutch members.

18. A hydraulic clamping apparatus according to claim 12 including annular seal means disposed, in said annular chamber and longitudinally spaced from said head portion.

19. A hydraulic clamping apparatus according to claim 18 wherein said first cylinder further defines a stop port communicating with the interior thereof and longitudinally spaced from said closed end by a distance less than the longitudinal spacing between said annular seal means and said head portion with said head portion engaging said closed end.

20. A hydraulic clamping apparatus according to claim 19 wherein said second cylinder defines drive and retraction ports communicating with internal portions thereof on opposite sides of said second piston.

* * * * *